Feb. 5, 1929.
W. F. RABBIDGE
1,701,274
CONTROL OF INTERNAL COMBUSTION ENGINES
Filed March 27, 1925
3 Sheets-Sheet 3
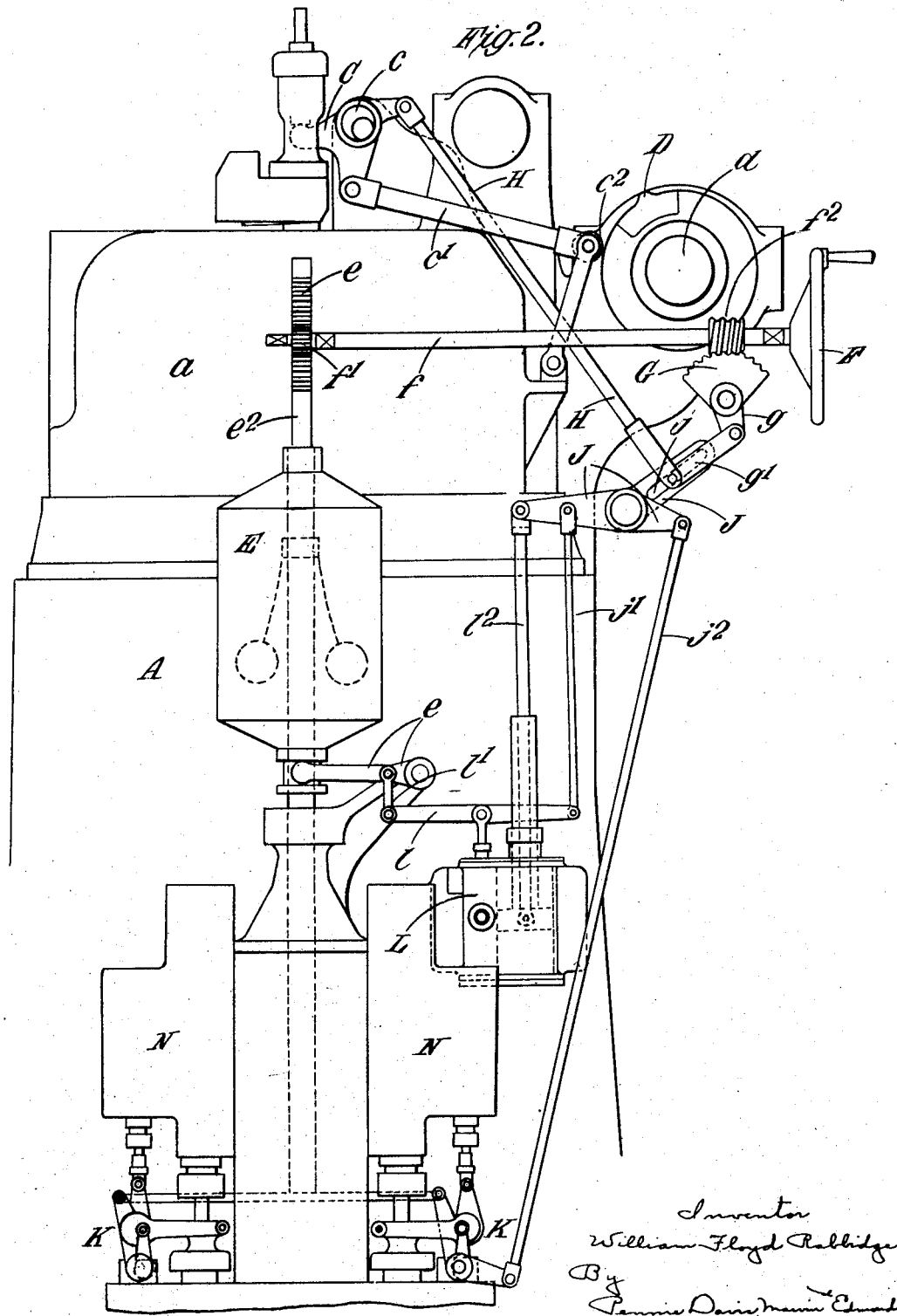

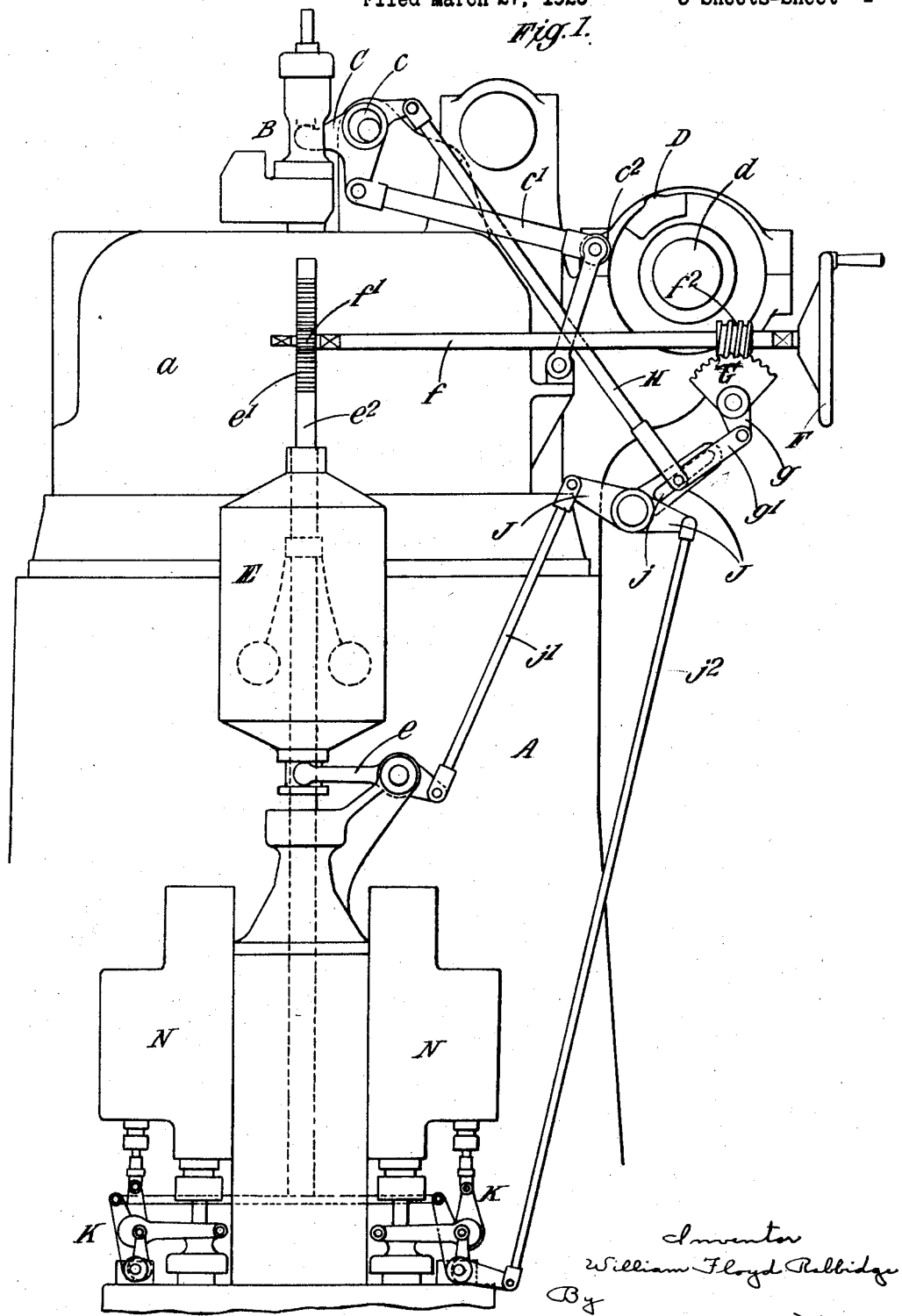

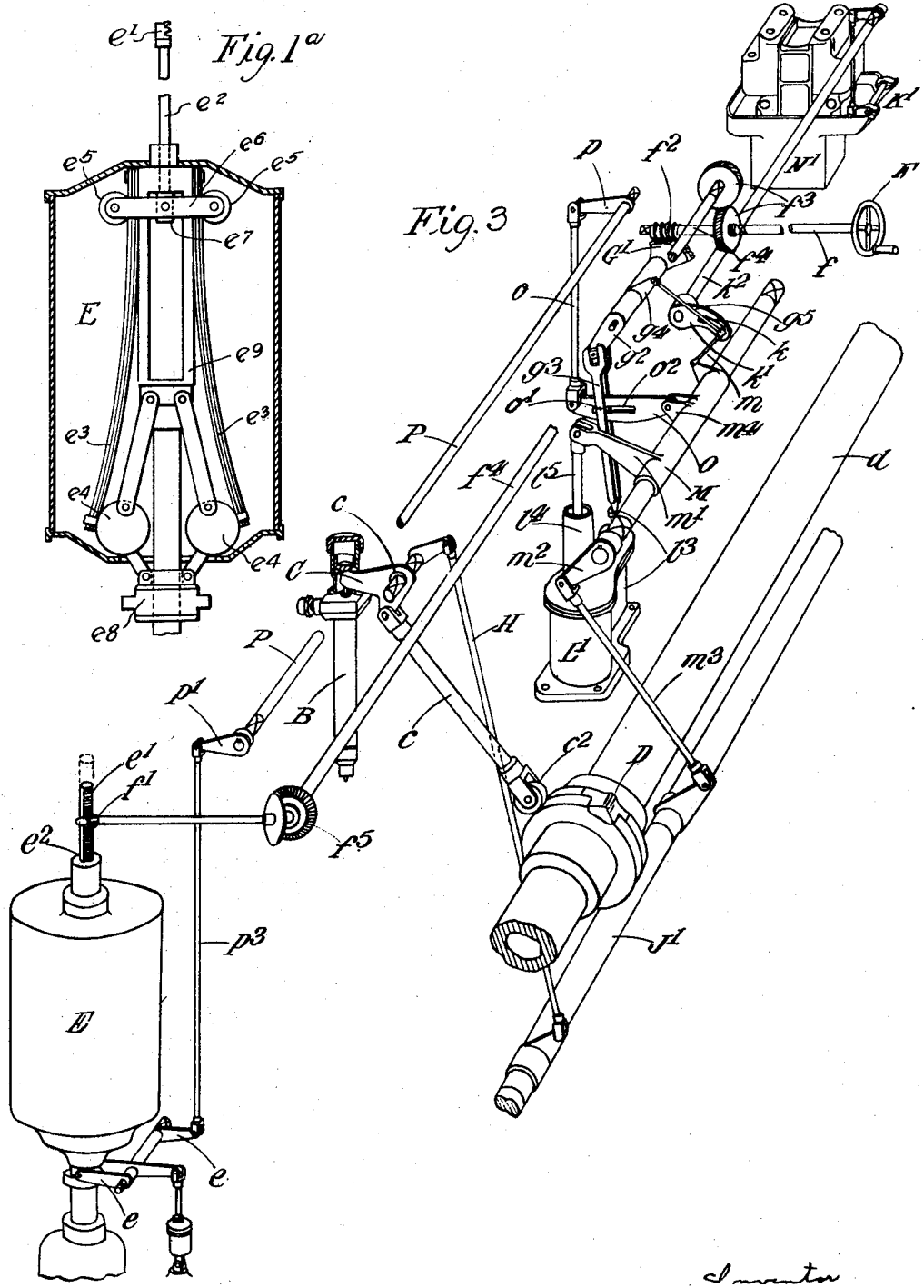

Patented Feb. 5, 1929.

1,701,274

UNITED STATES PATENT OFFICE.

WILLIAM FLOYD RABBIDGE, OF ULVERSTON, ENGLAND, ASSIGNOR TO VICKERS LIMITED, OF WESTMINSTER, ENGLAND, A BRITISH COMPANY.

CONTROL OF INTERNAL-COMBUSTION ENGINES.

Application filed March 27, 1925, Serial No. 18,755, and in Great Britain September 15, 1924.

This invention relates to controlling internal combustion engines, especially engines which have to run under governor control at large variations of speed, as for example in Diesel electric propelling installations where torques corresponding to those required at full power may be demanded even when the engine is running at a speed much below that of full power. In engines of this class the full-speed, full-torque functions of the fuel oil injection apparatus as regards the timing and duration of the admission of fuel, apart from the quantity of fuel supplied, are not suited to slow speed full-torque conditions and the chief object of the present invention is to provide for simultaneous adjustment of the governor and of the range of the fuel injection gear—apart from the fuel pump—to ensure efficient operation of the engine at large speed variations.

According to this invention the governor speed setting device adjusts also the fuel injection mechanism determining the duration of admission of the fuel supply, whereby as the governor is adjusted to maintain a reduced speed the range of the injection gear is limited correspondingly as regards the moment of opening the injection valve and duration of admission of the fuel. The range of the output of the fuel pump per stroke remains unaltered by such adjustment. By this means the fuel injection apparatus is enable to operate at maximum efficiency over all ranges of speed to which the governor is set and the necessary adjustments of the injection apparatus are made automatically in association with the setting of the governor.

The construction of apparatus which is adapted to carry out this invention may be varied in many ways and the governor may directly control the fuel pump and, through the variable gear, the injection gear or may control a servo-motor which operates the fuel pump control and through the variable gear the injection gear control. Or a variable control of the servo-motor may be adjusted by the governor setting mechanism.

In order that the said invention may be clearly understood and readily carried into effect, the same will now be described more fully with reference to the accompanying drawings, in which:—

Figure 1 is an elevation of governing and fuel gear in which the governor directly controls the pump and injection mechanism.

Figure 1ª is a vertical section of the governor setting device.

Figure 2 is a similar view showing a servo-motor controlled by the governor and operating the pump and injection controls, and Figure 3 is a perspective view illustrating the more complicated arrangement in which the range of a servo-motor is adjusted by the governor setting mechanism so that the fuel injection mechanism is controlled without any variable gear between it and the servo-motor.

In Figure 1 A is the engine cylinder with cover $a$ carrying the fuel injection valve B operated by the valve lever C mounted on the eccentric $c$ by the adjustment of which the fulcrum of the lever may be displaced. The valve lever is operated by the push rod $c'$ terminating in a cam roller $c^2$ operated by the usual fuel cam D on the cam shaft $d$. E is the governor, shown of centrifugal type and operating on the lever $e$. The governor is set for any speed at which it is desired to operate through the hand wheel F on the spindle $f$ provided with a pinion $f'$ engaging with the rack $e'$ on the governor adjusting rod $e^2$. The governor is indicated diagrammatically in Figures 1, 2 and 3 but an example of governor setting device suitable for the present apparatus is shown in Figure 1ª in which the plate springs $e^3$ acting on the governor balls $e^4$ have their effective length shortened or lengthened by the rollers $e^5$ on the cross member $e^6$ carried by a sleeve $e^7$ on the end of the rack rod $e^2$, the rod $e^2$ raising or lowering the member $e^6$ and consequently holding in the springs $e^3$ at a variable distance from their end. Figure 1ª shows the governor in its low speed setting, the set speed increasing as the rollers $e^5$ are lowered. The balls $e^4$ are linked to the lever operating collar $e^8$ and swing from the inner member $e^9$ carrying the springs $e^3$. The construction of the governor setting device, however, forms no part of the present invention.

The spindle $f$ carries the worm $f^2$ engaging the worm segment G, the arm $g$ of which, acting through the small link $g'$, adjusts the position of the end of the link H which determines the position of the eccentric $c$. The lower end of the link H engages in the slot $j$ in one arm of the bell crank lever J, another arm of the bell crank lever being connected through the link $j'$ to the governor lever $e$, while a third arm is connected through the long link $j^2$ to the fuel pump control gear K of well known type for the pumps N.

In this construction, as the hand wheel F is turned so as to adjust the governor E for lower speeds by raising the adjusting rack $e'$ the worm $f^2$ turns the worm segment G so as to displace the end of the link H towards the fulcrum of the bell crank J, the slot $j$ being suitably shaped so that in all positions of the wheel F the eccentric $c$ is in the "off" position when the governor E is in "cut off" position. By this means while at the full speed position of the wheel F the full range of the fuel cam D is available, at low speed positions only a portion of the lift of the cam can be used, due to the fact that as the wheel F is adjusted for low speeds the permissible movement of the fulcrum of the valve lever C in a direction which brings the roller $c^2$ towards the fuel cam D is less than at higher speed positions and so even when the speed of the engine falls or the governor moves to its full-on position only the upper portion of the fuel cam D reaches the roller $c^2$. This alters both the timing of the fuel admission and the angle and duration of admission in accordance with known practice. The fuel pump control is operated by the governor in unvarying ratio so that at any position of the wheel F the full output of the pump per stroke is available.

The arrangement shown in Figure 2 is of similar general type as regards the adjustment of the governor and the fuel mechanism but instead of the governor directly controlling the fuel pump and injection, as in the simple construction of Figure 1, a servo-motor L is introduced, the valve of which is connected through the lever $l$ and link $l'$ to the governor lever $e$, while the piston rod $l^2$ of the servo-motor is connected to one arm of the bell crank J. The servo-motor is of any ordinary construction and gives a movement to the crank arm which is dependent upon the movement of the governor acting through the connections $l$, $l'$ and the usual valve control of the servo-motor. The connecting rod $j'$ from the bell crank J is attached to the end of the lever $l$.

In the further servo-motor construction of Figure 3, which may be employed in cases where it is not desirable to fit reduction gear between the servo-motor L and the fuel spray valves B, the permissible travel of the servo-motor slide valve in the direction of full cam operation is reduced as the speed setting of the governor E is adjusted to lower speeds, thus giving a reduced travel in the fully open direction to the servo-motor and consequently by a direct servo-motor action a reduced permissible maximum opening to the spray valve. In this construction the fuel pump control is maintained at its full range by compensating gear which is adjusted to increase its effect upon the fuel pump control as the servo-motor travel is reduced. The hand setting wheel spindle $f$ shown is, as in the constructions already described, provided with a worm $f^2$ operating on a worm segment G' and with gearing interposed between it and the governor adjustment. The worm segment G' or equivalent hand wheel operated device acts through a lever $g^2$ and connecting rod $g^3$ upon the valve $l^3$ of the servo-motor L' so that the permissible travel of the valve in the fully open direction of the injection gear is adjusted according to the setting of the governor, and hunting gear operated by the piston $l^4$ of the servo-motor ensures a movement of the piston in proportion to the valve movement for all adjustments of reduced travel. The gear, provided for the same angular adjustment of the pump control mechanism for varying settings of the governor comprises a second lever $g^4$ carried by the worm segment and adjusting, through a connecting link $g^5$, the end of a connecting rod $m$ from a servo-motor operated spindle M in a suitably shaped slot $k$ belonging to an arm $k'$ on a spindle $k^2$ of the pump control gear K' of the pump N', thus varying the effective length of the lever arm $k'$ according to the position of the rod $m$, that is, according to the adjustment of the setting wheel F. The servo-motor connecting rod $l^5$ is connected to the rocking shaft J' of the bell crank by which the fuel valve lever eccentric is adjusted, through the lever $m'$, spindle M, lever $m^2$ and connecting rod $m^3$. In this construction the slotted member O, providing an adjustable reduction gear, is in the form of a lever connected at one end to an arm $m^4$ on the servo-motor operated spindle M and at the other end through the rod $o$ to lever connections from the governor comprising a shaft P (shown with part broken away), with lever arms $p$, $p'$ and connecting rod $p^3$ to the lever $e$, the pin $o'$ fixed to the rod $g^3$ and sliding in the slotted lever O being displaced according to the position of the connecting rod $g^3$ operating the servo-motor valve $l^3$, this rod $g^3$ carrying the pin $o'$ which is displaced along the slot $o^2$ according to the setting of the worm segment G' and consequently the setting of the governor E. The leverage of the lever O therefore varies simultaneously with, but inversely to, the leverage variation of the arm $k'$ due to the governor setting. The effect upon the valve $l^3$ of any movement of the governor rod $o$ is reduced as the connecting rod $g^3$ is swung nearer to the end of the slotted lever O which is jointed to the lever arm $m^4$.

The adjustment of the fuel valve lever fulcrum from the bell crank rocking shaft J' is similar to that shown in Figures 1 and 2 and requires no special description. The setting of the governor control rack $e'$ from the hand wheel F and rod $f$ is through the screw gear $f^3$, spindle $f^4$ (shown broken away) and bevel gear $f^5$.

What I claim and desire to secure by Letters Patent of the United States is:—

1. In means for controlling variable speed internal combustion engines, an adjustable speed governor, a governor setting device, fuel injection mechanism comprising a pump, an injection valve, engine operated mechanism for actuating the said valve, means for operating part of the said mechanism under governor control to vary the duration of opening of the said valve, and an operative connection between the governor setting device and said governor controlled operating means, so arranged as to vary the extent of the governor operated movement according to the adjustment of the governor setting device, the said operative connection acting independently of the controlling operation by the governor.

2. In engine controlling means as in claim 1, a servo-motor associated both with the governor and the governor setting device, through which servo-motor the injection valve mechanism is controlled.

3. In means for controlling variable speed internal combustion engines, an adjustable speed governor, a hand operated governor setting device, a fuel pump, a fuel injection valve, an engine operated fuel valve lever, a movable fulcrum member for the said lever, means for adjusting the position of the said fulcrum member under control of the governor, and an operative connection between the said hand operated setting device and the said fulcrum adjusting means, which connection varies the extent of the governor controlled movement through the fulcrum member of the fuel valve lever.

4. In means for controlling variable speed internal combustion engines, an adjustable speed governor, a hand-operated governor setting device, a fuel pump, a fuel injection valve, an engine operated fuel valve lever, a movable fulcrum member for the said lever, governor operated means for adjusting the position of the said fulcrum member, worm gearing actuated by the hand operated setting device, and a connection from the worm gearing to the said fulcrum adjustment means, such connection varying the extent of governor controlled adjustment according to the setting of the governor.

5. In means for controlling variable speed internal combustion engines, an adjustable speed governor, a governor setting device, fuel injection mechanism comprising a fuel pump, an injection valve, mechanism for actuating the said valve, means for operating part of the said mechanism under governor control to vary the duration of opening of the said valve, a bell crank operated by the governor setting device, a fuel valve lever, a movable fulcrum member for the said lever, means for adjusting the position of the said fulcrum member, a connection from the said adjusting means to the bell crank, and means operated by the governor setting device to displace the said connection along an arm of the bell crank to vary the effective leverage of the latter in accordance with the setting of the governor.

6. In means for controlling variable speed internal combustion engines, an adjustable speed governor, a governor setting device, a fuel injection mechanism comprising a fuel pump, an injection valve, engine operated mechanism for actuating the said valve, means for operating part of the said mechanism under governor control to vary the duration of opening of the said valve, a servo-motor having a controlling valve adjusted by the governor setting device, and a piston rod connected to the said governor controlled operating means so arranged as to vary the extent of the governor operated movement according to the adjustment of the governor setting device.

7. In means for controlling variable speed internal combustion engines, an adjustable speed governor, a governor setting device, fuel injection mechanism comprising a fuel pump, an injection valve, an engine operated fuel valve lever having a movable fulcrum member, means for adjusting the position of the said fulcrum member, means for operating part of the lever actuating mechanism under governor control to vary the duration of opening of the said valve, a servo-motor under the control of the governor setting device, a bell crank connected to the servo-motor, a connection from the said valve lever fulcrum adjusting means to the bell crank, and means operated by the governor setting device which displaces the said connection at the bell crank to vary the effective leverage of the latter in accordance with the setting of the governor.

8. In means for controlling variable speed internal combustion engines, an adjustable speed governor, a governor setting device, fuel injection mechanism comprising a fuel pump, an injection valve, mechanism for actuating the said valve, means for operating part of the said mechanism under governor control to vary the duration of opening of the said valve, a servo-motor under the control of the governor setting device, a connection between the servo-motor and the injection valve actuating mechanism, whereby the motor varies the extent of the governor operated movement according to the setting of the governor, a fuel pump, and compensating gear between the pump and the servo-motor control, whereby the fuel pump control is maintained at its full range throughout any variations in the setting of the governor.

9. In means for controlling variable speed internal combustion engines, an adjustable speed governor, a governor setting device, fuel injection mechanism comprising a pump, an injection valve, engine operated mechanism for actuating the said valve, means for operating part of the said mechanism under governor control to vary the duration of opening of the said valve, a servo-motor, the controlling valve gear of which is adjusted by the governor setting device, hunting gear providing for movement of the servo-motor in accordance with the valve movement, fuel pump control mechanism, compensating gear between the fuel pump control mechanism and the governor setting device, and means for adjusting the said compensating gear by the servo-motor, whereby the effective leverage of the compensating gear is varied with the adjustment of the governor speed setting mechanism so as to maintain the pump control at its full range of operation.

10. In means for controlling variable speed internal combustion engines, an adjustable speed governor, a governor setting device, fuel injection mechanism comprising a fuel pump, an injection valve, engine operated mechanism for actuating the said valve, means for operating part of the said mechanism under governor control to vary the duration of opening of the said valve, a fuel pump, pump control gear, a servo-motor with controlling valve, lever connections from the governor setting device to the said valve, hunting gear for the said motor to give a motor movement corresponding to the valve adjustment, a shaft operated by the servo-motor, connections from the said shaft to the injection valve actuating mechanism, a slotted lever member connected to the said shaft and to the governor setting mechanism, a pivot pin carried by a member of the said lever connections to the servo-motor valve and displaceable in the said slotted lever member to provide adjustable leverage, and compensating gear between the fuel pump control gear and the said servo-motor operated shaft, whereby the fuel pump control is maintained at its full range throughout any variations in the setting of the governor.

11. In means for controlling variable speed internal combustion engines, an adjustable speed governor, a governor setting device, fuel injection mechanism comprising a fuel pump, an injection valve, mechanism for actuating the said valve, means for operating part of the said mechanism under governor control to vary the duration of opening of the said valve, a fuel pump, pump control gear, a servo-motor with controlling valve, lever connections from the governor setting device to the said valve, hunting gear for the said motor to give a motor movement corresponding to the valve adjustment, a shaft operated by the servo-motor, connections from the said shaft to the injection valve actuating mechanism, a slotted lever member connected to the said shaft and to the governor setting mechanism, a pivot pin carried by a member of the said lever connections to the servo-motor valve and displaceable in the said slotted lever member to provide adjustable leverage, a slotted lever arm on the pump control gear, a lever on the servo-motor operated shaft, a link from the governor setting gear and a connecting rod from the said link to the said shaft lever, the end of which connecting rod slides in the slot in the said slotted lever, whereby the leverage of the slotted lever is varied according to the adjustment of the governor setting mechanism so that the fuel pump control is maintained at its full range throughout any variations in the setting of the governor.

WILLIAM FLOYD RABBIDGE.